United States Patent Office 3,598,798
Patented Aug. 10, 1971

3,598,798
PRODUCTION OF VINYL CHLORIDE POLYMERS
Hans-Georg Trieschmann, Birkenweg, Hambach, Germany, assignor to Badische Anilin- & Soda-Fabrik Aktiengesellschaft, Ludwigshafen (Rhine), Germany
No Drawing. Filed July 31, 1968, Ser. No. 748,913
Claims priority, application Germany, Aug. 9, 1967,
P 17 20 288.9
Int. Cl. C08f 3/30
U.S. Cl. 260—928                                    9 Claims

ABSTRACT OF THE DISCLOSURE

The polymerization of vinyl chloride, with or without other monomers, in two zones, only small amounts of vinyl chloride being polymerized in the first zone, the vinyl chloride being separated from the polymer, and the purified vinyl chloride being polymerized in the second zone.

---

This invention relates to the polymerization of vinyl chloride in the presence of polymerization initiators.

It is known that impurities contained in monomers can influence the course of polymerization. For this reason the monomers are purified prior to polymerization. Vinyl chloride can be purified for example by distillation or pressure scrubbing. Vinyl chloride purified in this way satisfies the requirements of industrial polymerization methods.

We have now found that vinyl chloride polymers having particularly advantageous properties are obtained in the polymerization of vinyl chloride in the presence of polymerization initiators and if desired mixed with other monomeric compounds which are copolymerizable with vinyl chloride, when vinyl chloride is introduced into a zone in which a small amount is polymerized and the vinyl chloride is discharged from the zone, separated from the polymer and then polymerized in a second zone.

The process is particularly suitable for the production of homopolymers of vinyl chloride. Copolymers of vinyl chloride and other monomeric compounds which are copolymerizable with vinyl chloride may however also be obtained by the process. The process is not limited to polymerizing vinyl chloride which has been prepared by any particular method although it gives the best results in the polymerization of vinyl chloride which has been prepared by adding on hydrogen chloride to acetylene.

The vinyl chloride is first introduced into a zone in which small amounts of the monomer are polymerized, this being the first stage. It is advantageous to pass the vinyl chloride in gaseous phase through the zone because the solid polymer formed can easily be separated from the gaseous vinyl chloride. In most cases it is sufficient to polymerize amounts of vinyl chloride which are less than 2% and preferably less than 0.5%. Larger amounts of monomer may be polymerized, but no additional effect is thereby achieved.

The monomer is polymerized in this zone under the influence of a polymerization initiator which may be present in solid or liquid phase. Thus for example the polymerization initiator may be arranged on solid carrier substances. These catalysts may be arranged in a layer in the zone so that the monomeric vinyl chloride can be passed through the layer. Sometimes it is advantageous to pass the vinyl chloride down through the layer so that polymer deposited by the stream of monomer is entrained and can be separated at the bottom of the layer. The solid initiator may also be arranged in a fluidized bed. In this case the initiator and polymer may be discharged from the fluidization zone and replenished by fresh amounts of initiator.

It is also possible however to pass the monomeric vinyl chloride through solutions or suspensions containing polymerization initiators. Moreover the initiator solutions and suspensions may be brought into countercurrent contact with the monomeric vinyl chloride in a spray tower.

Conventional polymerization initiators may be used, for example those described in the book by Dr. H. Kainer "Polyvinylchlorid und Vinylchlorid-Mischpolymerisate," Springer-Verlag, Berlin, Heidelberg, New York, 1965. The most important initiators belong to the classes of peroxy compounds, azo compounds and alkyl metal compounds.

Polymerization is carried out in such a way that only a small amount of the monomer is polymerized. This can be achieved by the choice of the polymerization initiator, the temperature prevailing in the zone and the dimensions of the zone. Thus for example monomeric vinyl chloride may be passed over or through a fixed-bed initiator and the temperature in the zone adjusted so that spontaneous polymerization of the vinyl chloride is avoided. The temperature is dependent on the type of initiator. The monomer may be passed through the zone at atmospheric or superatmospheric pressure.

The separation methods commonly used in chemical technology may be used for separating the polymer from the monomer. The separation of solid polymers may be carried out for example by centrifuging, filtration or electrostatic precipitation. Adsorption or filtration methods are for example advisable for separating liquid polymers or oligomers.

The monomeric vinyl chloride pretreated in this way is then polymerized in a second zone under the influence of polymerization initiators. The same initiators may be used as in the first stage. It is also possible however to use another type of polymerization initiator for the polymerization of the monomers. The polymerization may be carried out in bulk, in solution, in suspension, in emulsion or in the gas phase. The processes for the polymerization of vinyl chloride are described for example in the above-mentioned book by H. Kainer. The process is particularly suitable for the photopolymerization of vinyl chloride.

For photopolymerization it is advantageous to allow light having a wavelength of from 2000 to 7000 A., preferably from 2500 to 3800 A., to act on the vinyl chloride. Sunlight or light which has been produced by any suitable light source may also be allowed to act on the vinyl chloride. Examples of suitable light sources are high or low pressure mercury arc lamps or tungsten lamps. The polymerization may be carried out within a relatively wide range of temperatures. Thus for example monomeric vinyl chloride can be polymerized at temperatures of $-80°$ C. or $+120°$ C. It is advantageous however to use a temperature range of from $-30°$ to $+60°$ C. Photosensitizers need not but may be added. Sometimes it is advisable to add to the system substances which regulate the course of the polymerization.

Impurities which might disturb the further course of the polymerization are removed by the polymerization of small amounts of monomer in the first stage. It has been found that in the formation of the resultant oligomers or polymers the impurities are incorporated into the oligomer or polymer molecules. The process according to this invention has the advantage that in the production of the homopolymers or copolymers in the second stage, considerably smaller amounts of initiator are used than is customary in other methods. It is moreover particularly advantageous that according to this invention polymers of high purity can be obtained which are considerably more stable to thermal and oxidative degradation than prior art polymers.

The invention is illustrated by the following examples. The parts and percentages are by weight.

EXAMPLE 1

(a) 100 parts of vinyl chloride is mixed with 0.002 part of tertiary-butyl perpivalate in an autoclave (located upstream of the actual polymerization autoclave) and is kept at 30° C. for two hours. About 0.4 part of polyvinyl chloride forms in the autoclave. The unreacted vinyl chloride is then distilled into the actual polymerization autoclave which contains 200 parts of water, 0.2 part of polyvinyl alcohol and 0.10 part of dilauroyl peroxide. The whole is heated to an internal temperature of 56° C. with intense stirring and polymerization is carried out with external cooling until a drop in pressure occurs. About 85 parts of polyvinyl chloride which is distinguished by particularly high thermal stability is obtained within ten hours. The K value is 70.

(b) The same procedure is followed without pretreatment with tertiary-butyl perpivalate. Thirteen to fifteen hours are required for the same conversion and a polyvinyl chloride is obtained having clearly lower stability.

EXAMPLE 2

In a manner analogous to Example 1, vinyl chloride is subjected to photopolymerization (a) with pretreatment with tertiary-butyl perpivalate and (b) without this pretreatment. For this purpose the vinyl chloride is placed in a quartz vessel with complete exclusion of oxygen and the samples (a) and (b) are exposed to the ultraviolet radiation from a mercury vapor lamp.

The sample (a) which has been pretreated begins to polymerize after twenty to forty minutes and results in a polyvinyl chloride having a K value of 68 at room temperature within a few hours.

The sample (b) which has not been pretreated does not begin to polymerize until after four to ten hours and results in a product having an extremely wide molecular weight distribution. The mean K value is 63.

EXAMPLE 3

A granulated catalyst carrier of aluminum silicate is impregnated with a 0.1% solution of azodiisobutyronitrile in acetone and then freed from solvent in vacuo so that the dry catalyst contains about 0.05% of initiator. The catalyst is then charged into a column and the column is tempered at +30° C. Gaseous commercial vinyl chloride is allowed to flow at moderate speed through the column and is then condensed in a cold trap. About 0.1% by weight of the vinyl chloride polymerizes in the column to form low molecular weight oligomers. Photopolymerization is carried out as described in Example 2 with the vinyl chloride thus purified. There is a clearly higher rate of polymerization and polymers having higher molecular weight are obtained than with unpurified vinyl chloride.

I claim:
1. A process for the production of vinyl chloride polymers by polymerization of vinyl chloride in the presence of a polymerization initiator with or without other monomeric compounds which are copolymerizable with vinyl chloride, wherein vinyl chloride is introduced into a zone in which a small amount thereof is polymerized, and the vinyl chloride is removed from the zone, separated from the polymer and then polymerized in a second zone.

2. A process as claimed in claim 1 wherein less than 2% of the total amount of vinyl chloride is polymerized in the first zone.

3. A process as claimed in claim 1 wherein less than 0.5% of the total amount of vinyl chloride is polymerized in the first zone.

4. A process as claimed in claim 1 wherein the vinyl chloride is polymerized in the first zone by means of a peroxide.

5. A process as claimed in claim 1 wherein the vinyl chloride is polymerized in the first zone by means of a fixed-bed catalyst.

6. A process as claimed in claim 1 wherein the vinyl chloride is polymerized in the first zone by means of a fluidized-bed catalyst.

7. A process as claimed in claim 1 wherein the vinyl chloride is passed in the first zone through a solution or suspension of the initiator.

8. A process as claimed in claim 1 wherein the vinyl chloride in the first zone is brought into countercurrent contact with an initiator solution or suspension in a spray tower.

9. A process as claimed in claim 1 wherein the vinyl chloride is polymerized in the second zone by photopolymerization.

References Cited
UNITED STATES PATENTS

| | | | |
|---|---|---|---|
| 2,876,193 | 1/1959 | Pollack | 260—89.5 |
| 3,297,734 | 1/1967 | Arman et al. | 260—89.5 |

JOSEPH L. SCHOFER, Primary Examiner

J. A. DONOHUE, Jr., Assistant Examiner

U.S. Cl. X.R.

260—875; 201—15, 22